United States Patent
Curtis et al.

(10) Patent No.: US 9,559,865 B2
(45) Date of Patent: Jan. 31, 2017

(54) VIRTUAL NETWORK DEVICE IN A CLOUD COMPUTING ENVIRONMENT

(71) Applicant: Verizon Patent and Licensing Inc., Basking Ridge, NJ (US)

(72) Inventors: Paul M. Curtis, Sudbury, MA (US); Marc J. Cochran, Shrewsbury, MA (US); John F. Considine, Hollis, NH (US); Kevin J. Clarke, Reading, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 133 days.

(21) Appl. No.: 14/075,409

(22) Filed: Nov. 8, 2013

(65) Prior Publication Data

US 2015/0131661 A1  May 14, 2015

(51) Int. Cl.
*H04L 12/28* (2006.01)
*H04L 12/46* (2006.01)
*H04L 12/741* (2013.01)
*H04L 12/725* (2013.01)
*H04L 12/18* (2006.01)

(52) U.S. Cl.
CPC ....... *H04L 12/4641* (2013.01); *H04L 12/1886* (2013.01); *H04L 45/30* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 2004/0028058 A1* | 2/2004 | Katoh | H04L 12/1886 370/395.53 |
| 2005/0163115 A1* | 7/2005 | Dontu | H04L 12/46 370/389 |
| 2006/0062187 A1* | 3/2006 | Rune | H04L 12/2856 370/338 |
| 2007/0274321 A1* | 11/2007 | Jonsson | H04L 12/2856 370/395.53 |
| 2010/0192218 A1* | 7/2010 | Shah et al. | 726/13 |
| 2011/0093849 A1* | 4/2011 | Chawla | H04L 41/0816 718/1 |

(Continued)

FOREIGN PATENT DOCUMENTS

| | | | | |
|---|---|---|---|---|
| CN | WO 2014032609 A1 * | 3/2014 | | H04L 12/462 |
| WO | WO 2014032598 A1 * | 3/2014 | | |

*Primary Examiner* — Kibrom T Hailu

(57) ABSTRACT

A device, of a cloud computing environment, includes a virtual network device that receives a packet with an address, and determines whether the packet is a broadcast packet or a unicast packet. The virtual network device processes the packet based on whether the packet is a broadcast packet or a unicast packet. The packet is transmitted to local address(es) or remote address(es) when the packet is a broadcast packet. The local address(es) is associated with at least one hardware component of the device, and the remote address(es) is associated with at least one other device, of the cloud computing environment, that is separate from the device. The packet is transmitted based on whether the address, of the packet, matches the local address (es) or the remote address(es) when the packet is a unicast packet.

20 Claims, 15 Drawing Sheets

(56) References Cited

U.S. PATENT DOCUMENTS

| | | | |
|---|---|---|---|
| 2011/0103284 A1* | 5/2011 | Gundavelli | H04L 12/18 370/312 |
| 2013/0136123 A1* | 5/2013 | Ge | H04L 12/4645 370/390 |
| 2014/0064278 A1* | 3/2014 | G. Santos | H04L 45/54 370/392 |
| 2014/0241353 A1* | 8/2014 | Zhang | H04L 45/74 370/390 |

* cited by examiner

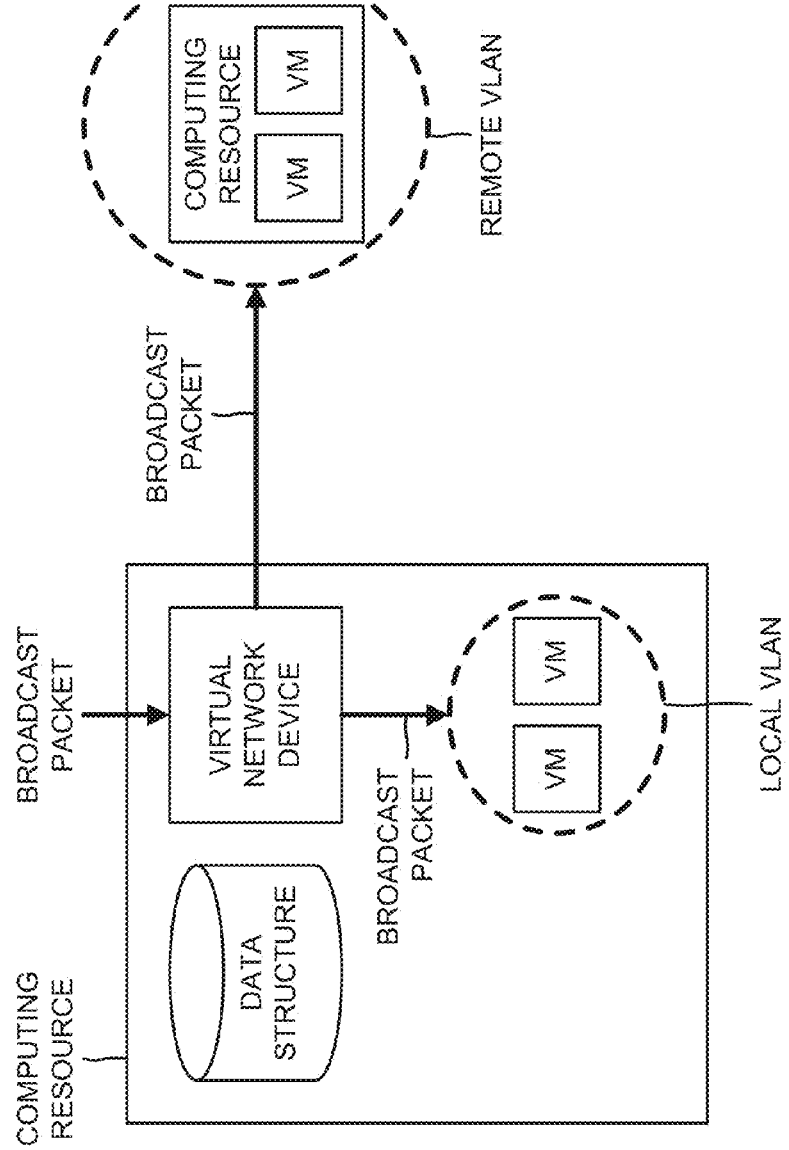

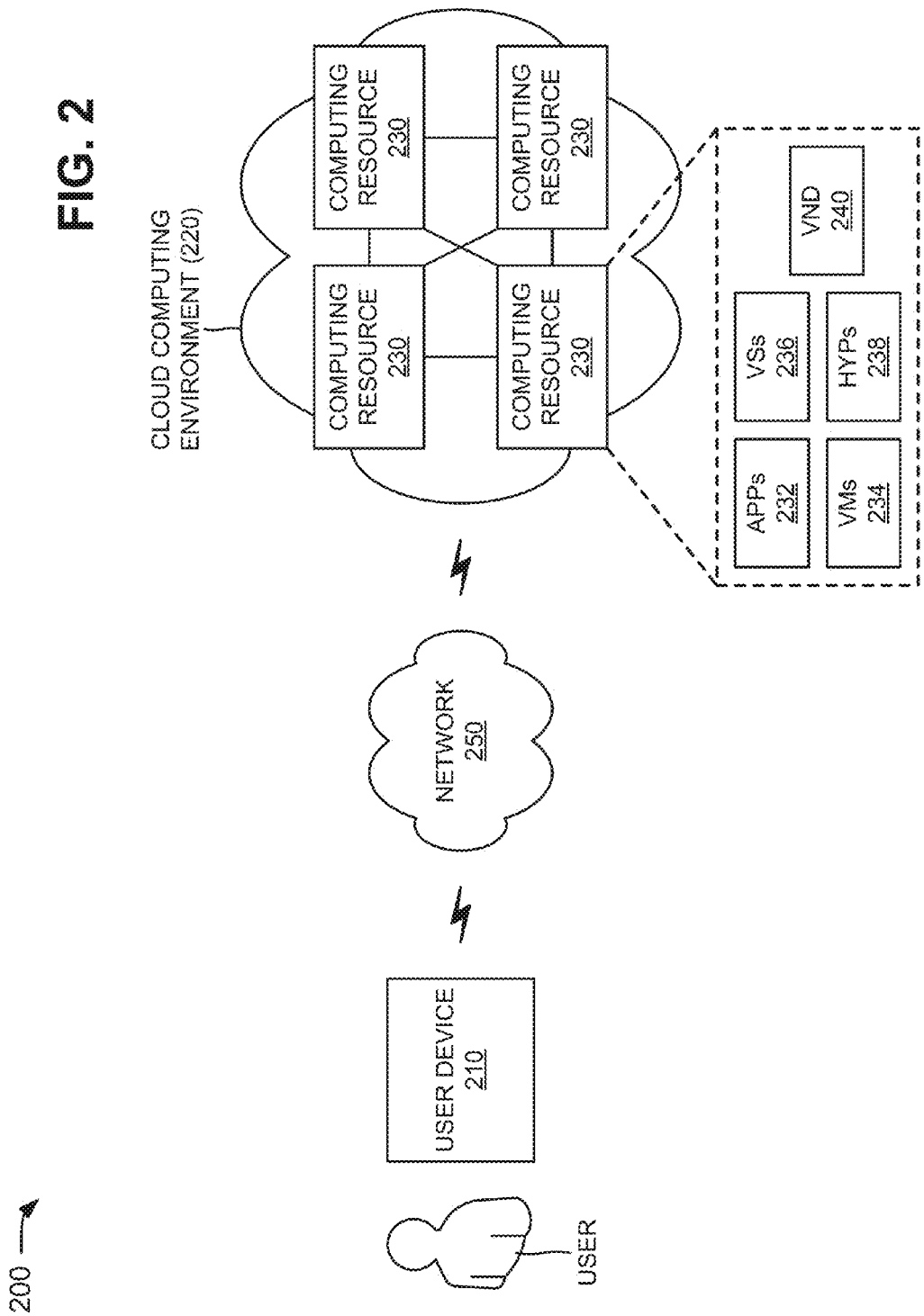

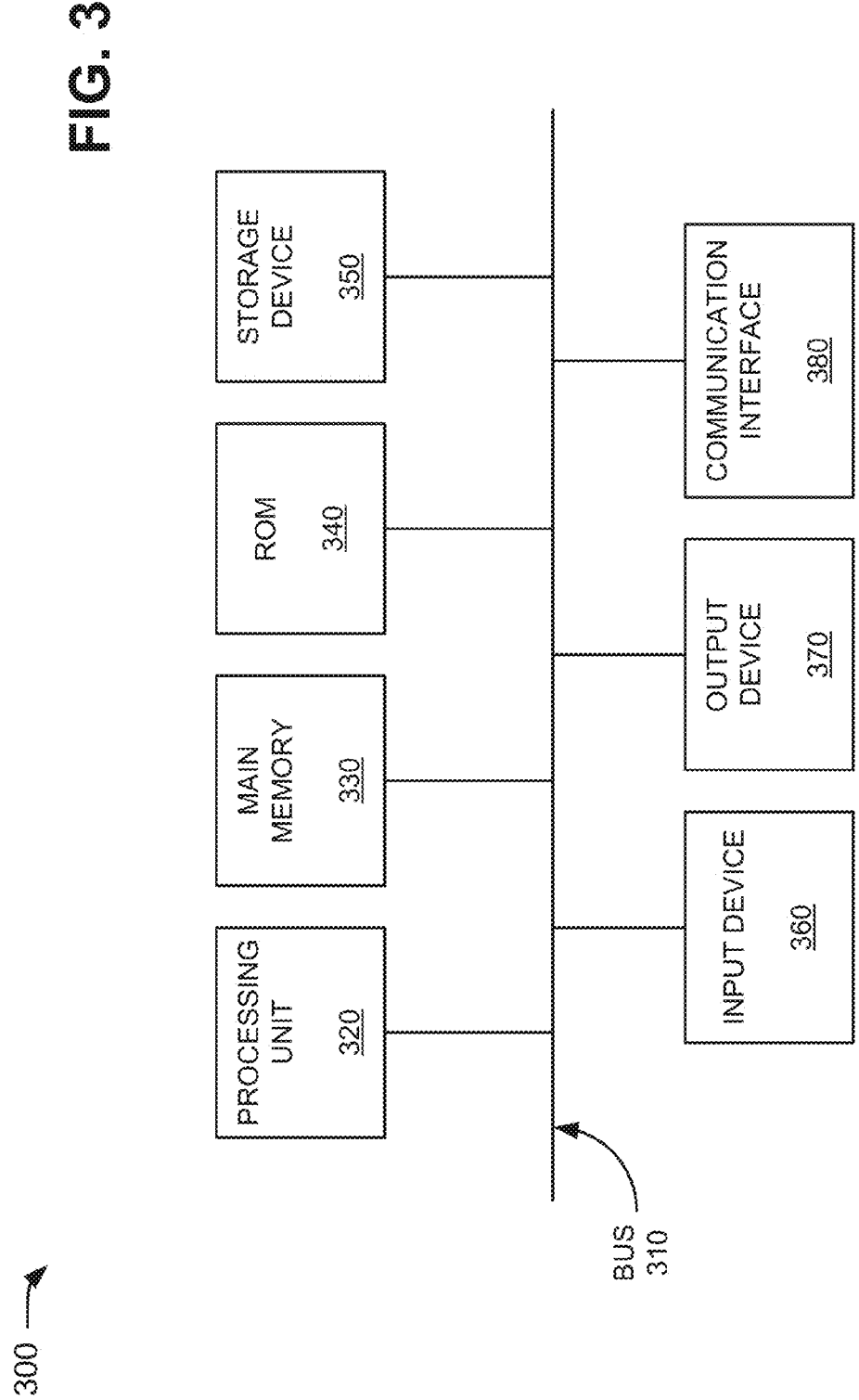

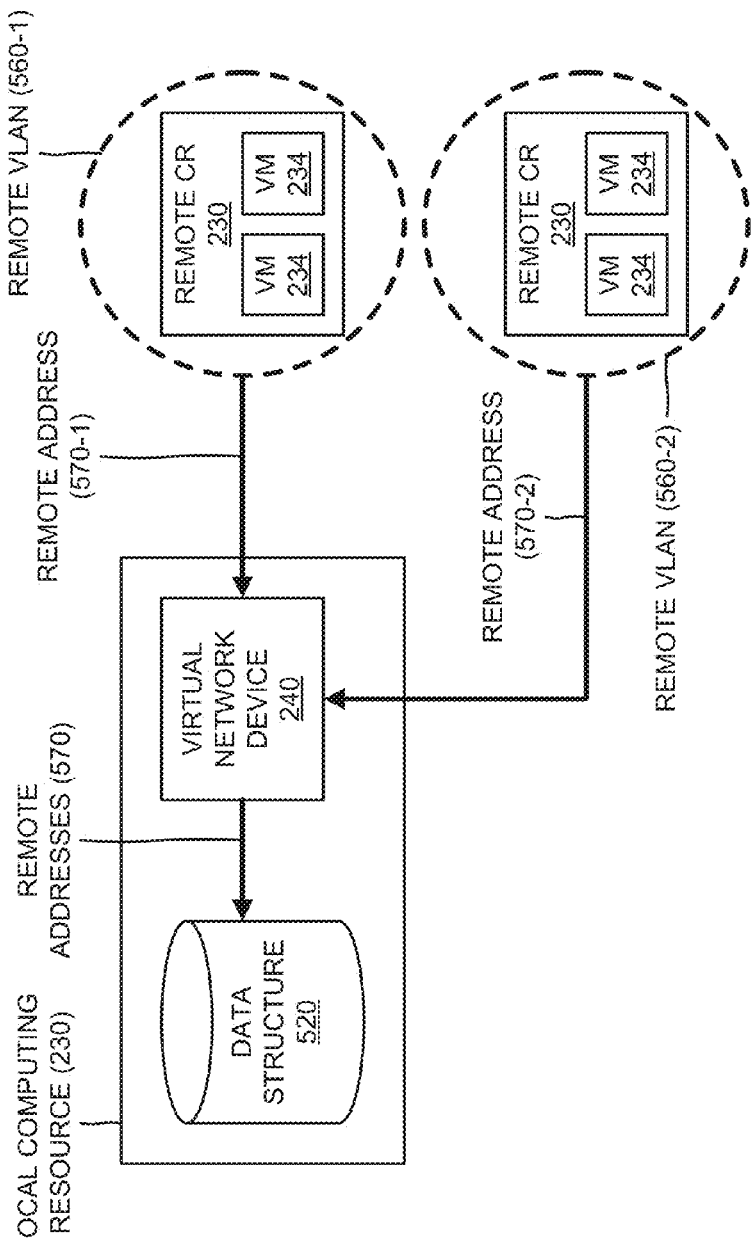

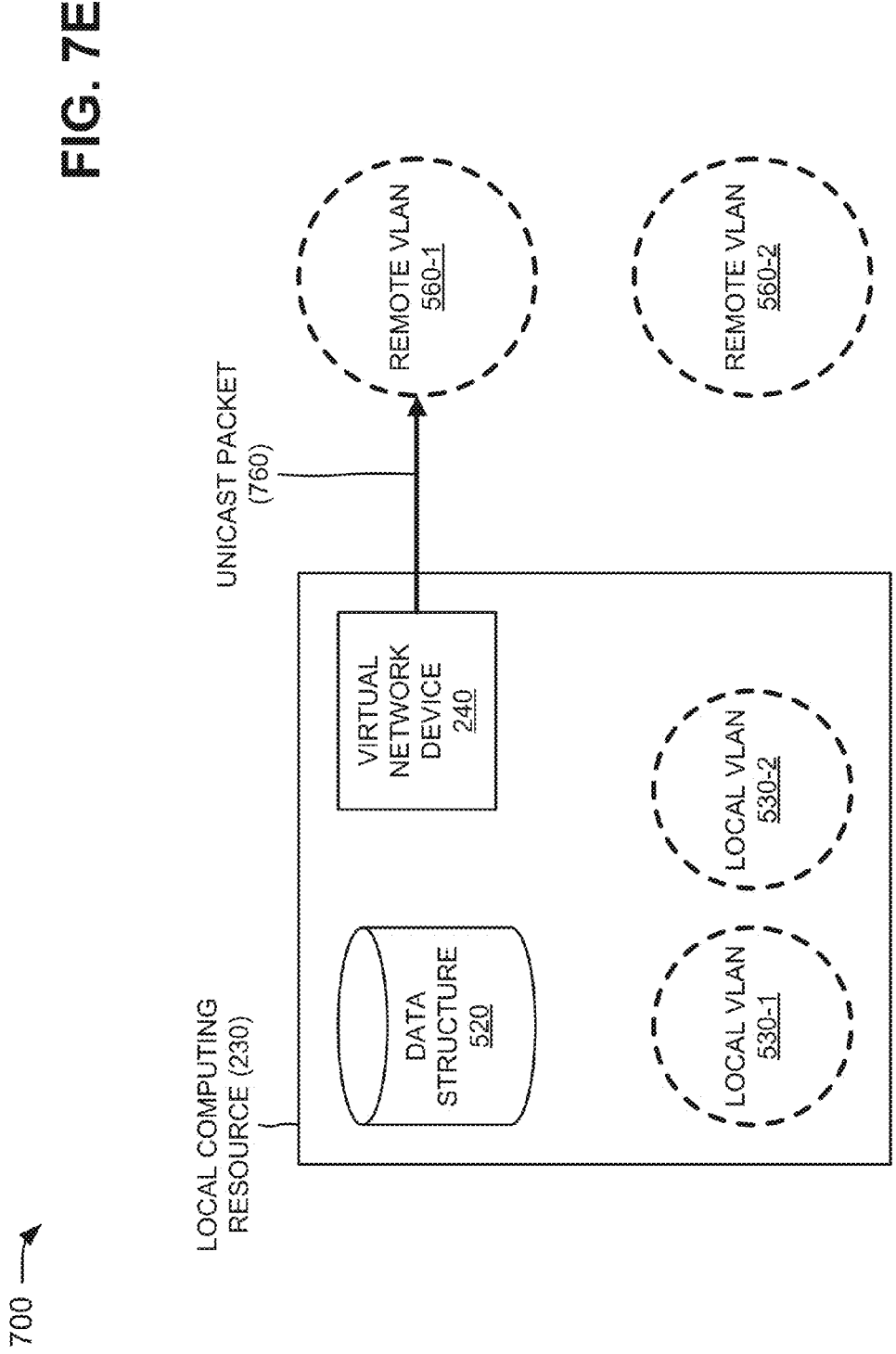

VIRTUAL NETWORK DEVICE IN A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. Cloud providers may use software defined networks (SDNs) to manage the VMs in the cloud computing environment. The SDNs may utilize standard network devices (e.g., switches) to manage communication between the VMs. Despite being able to support over 4,000 virtual local area networks (VLANs) and 16,000 media access control (MAC) addresses, the standard network devices are unable to manage communications between the large number of VMs provided in a cloud computing environment.

BRIEF DESCRIPTION OF THE DRAWINGS

FIGS. 1A and 1B are diagrams of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIGS. 5A-5D are diagrams of an example of the process described in connection with FIG. 4;

FIGS. 7A-7E are diagrams of an example of the process described in connection with FIG. 6.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a virtual network device in computing resources provided in a cloud computing environment and may enable the virtual network devices to scale to a large number of VMs or other cloud resources. The virtual network devices may utilize a Layer 2 (e.g., a data link layer) protocol to transfer data between computing resources (e.g., remote VLANs) in the cloud computing environment or between local hardware (e.g., local VLANs) within the same computing resource. Each virtual network device may know the addresses in the local VLANs and the remote VLANs.

Figure 1B:
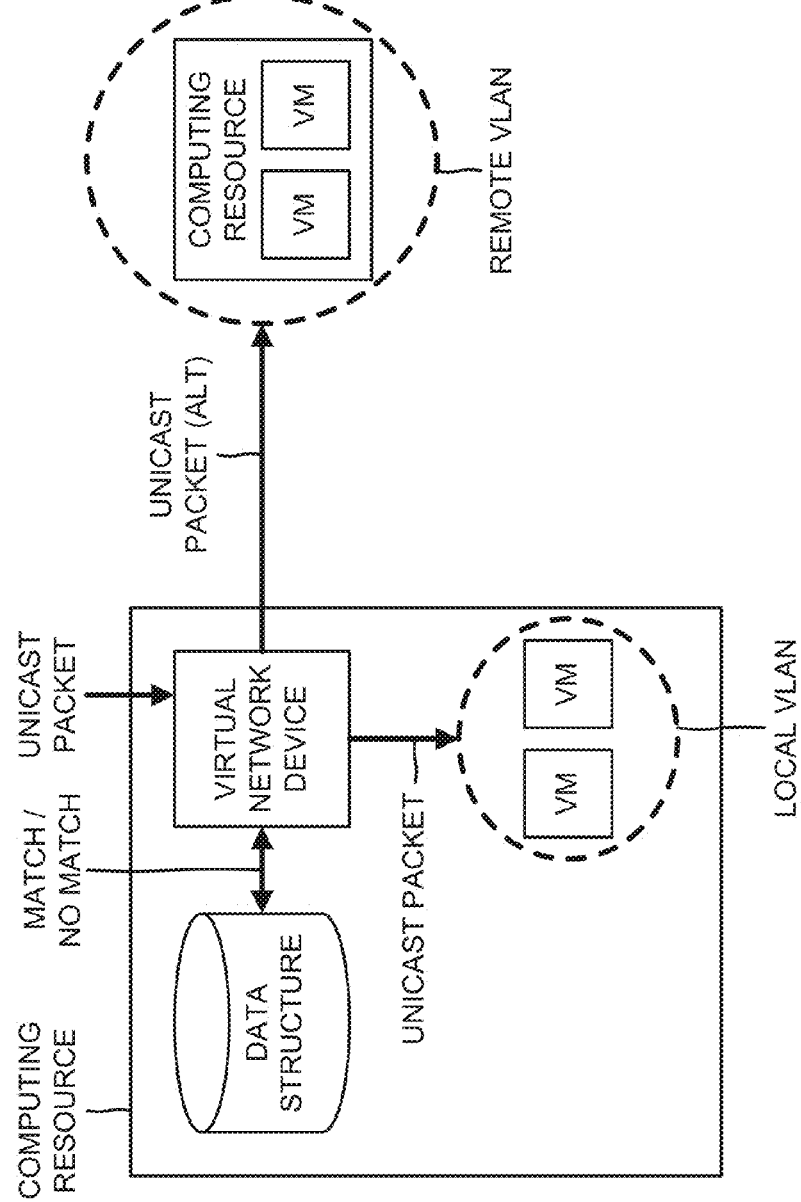

FIGS. 1A and 1B are diagrams of an overview of example implementations described herein. For the overview, assume that a cloud computing environment includes multiple computing resources, as shown in FIG. 1A. A computing resource may include a virtual network device, VMs, a data structure, etc. A virtual network device may include a virtual router, a virtual switch, a virtual gateway, and/or another virtual network device that processes and/or transfers traffic (e.g., packets).

One or more hardware components provided in a particular computing resource, and executing the VMs, may form one or more local VLANs for the particular computing resource. One or more computing resources, separate from the particular computing resource, may form one or more remote VLANs for the particular computing resource. Each virtual network device may know the addresses in the local VLANs and the remote VLANs since the addresses may be stored in a data structure. The data structure may include a database, a table, a list, an array, etc.

For the overview, assume that a virtual network device, of a particular computing resource, receives a broadcast packet from the cloud computing environment, as further shown in FIG. 1A. The broadcast packet may include a packet that is to be broadcast to any VLAN associated with the particular computing resource and within a single Layer 2 network. For example, the broadcast packet may include information associated with a software application that is executed by multiple VMs associated with the particular computing resource and other computing resources. When the broadcast packet is received by the virtual network device, the virtual network device may broadcast the packet to the local VLAN or to the remote VLAN, as further shown in FIG. 1A. This way the multiple VMs executing the software application may receive the information provided in the broadcast packet.

For the overview, now assume that a unicast packet is received by the virtual network device, as shown in FIG. 1B. The unicast packet may include a packet that is to be provided to a single VLAN associated with the particular computing resource. For example, the unicast packet may include content to be stored in virtualized storage associated with the particular computing resource or another computing resource. The virtual network device may compare an address of the unicast packet to addresses in the data structure. If the packet address does not match an address found in the data structure, the virtual network device may broadcast the packet to the local VLAN or to the remote VLAN, as shown in FIG. 1A. If the packet address matches a local address found in the data structure, the virtual network device may provide the unicast packet to a destination VM in a corresponding local VLAN, as shown in FIG. 1B. If the packet address matches a remote address found in the data structure, the virtual network device may provide the unicast packet to a destination VM in a corresponding remote VLAN, as further shown in FIG. 1B.

Such an arrangement may enable the cloud computing environment to support any number of VMs or other cloud resources (e.g., virtualized storage, hypervisors, etc.) provided in the cloud computing environment. The arrangement may enable users of the cloud computing environment to create an unlimited number of VMs, hypervisors, etc. in the cloud computing environment, and the cloud computing environment can scale accordingly to handle the number of VMs, hypervisors, etc.

FIG. 2 is a diagram of an example environment 200 in which systems and/or methods described herein may be implemented. As illustrated, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant (PDA), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230) and a management device 240. Computing resource 230 may include one or more personal computers, workstation computers, server devices, storage devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VS) 236, one or more hypervisors (HYPs) 238, a virtual network device (VND) 240, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage the infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Virtual network device 240 may include may include a software implementation that provides functionality similar to a network device. For example, virtual network device 240 may provide functionality similar to a gateway, a router, a switch, a firewall, a network interface card (NIC), a hub, a bridge, a proxy server, an optical add-drop multiplexer (OADM), or some other type of device that processes and/or transfers traffic (e.g., packets).

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. Each of the devices of environment 200 may include one or more devices 300 and/or one or more components of device 300. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, application-specific integrated circuits (ASICs), field-programmable gate arrays (FPGAs), or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive, or a removable memory, such as a flash drive.

Input device 360 may include a component that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a component that outputs information to the user, including a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
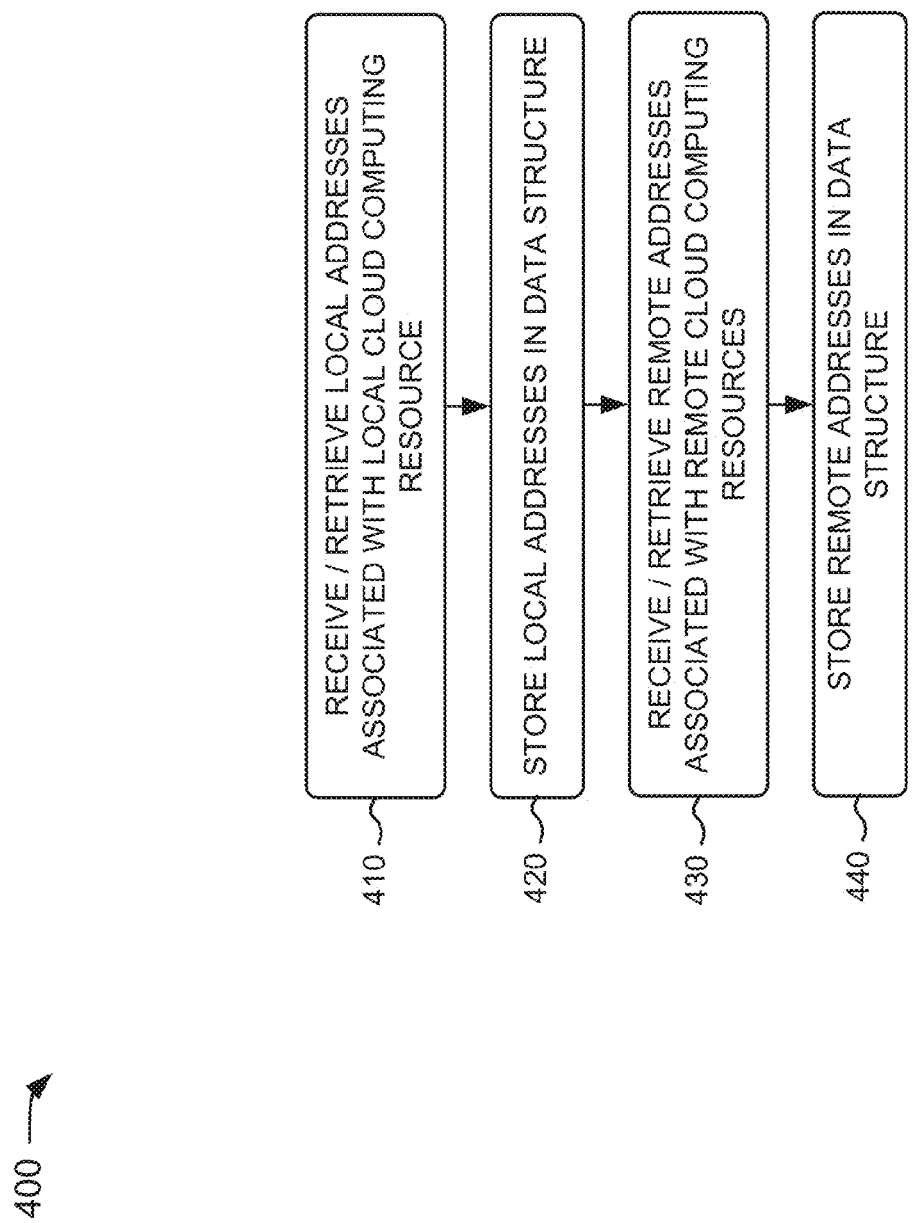
FIG. 4 is a flow chart of an example process for populating a data structure with local addresses and remote addresses associated with a computing resource of a cloud computing environment.

FIG. 4 is a flow chart of an example process 400 for populating a data structure with local addresses and remote addresses associated with a computing resource of a cloud computing environment. In some implementations, process 400 may be performed by computing resource 230. In some implementations, process 400 may be performed by another device or a group of devices separate from or including computing resource 230.

As shown in FIG. 4, process 400 may include receiving or retrieving local addresses associated with a local computing resource of a cloud computing environment (block 410). For example, a particular computing resource 230 (also referred to herein as a local computing resource 230) may include multiple hardware components that enable the particular computing resource 230 to provide applications 232, virtual machines 234, virtualized storage 236, hypervisors 238, virtual network device 240, etc. In some implementations, the hardware components may include processing units 320, such as, for example, network processing units (NPUs). One or more processing units 320 may be associated with a VLAN (e.g., referred to herein as a local VLAN) that is local to the particular computing resource 230. In some implementations, each local VLAN may include one or more applications 232, virtual machines 234, virtualized storage 236, hypervisors 238, etc.

In some implementations, each local VLAN may be associated with a corresponding address (e.g., referred to herein as a local address) that enables the particular computing resource 230 to provide traffic (e.g., packets) to and/or receive traffic from each local VLAN. Each local address may include a media access control (MAC) address (e.g., 00:11:22:33:44) or the like.

In some implementations, some or all of the remaining computing resources 230 of cloud computing environment 220 may also include virtual network devices. Each of virtual network devices 240 may include a global address (e.g., a MAC address, etc.) that is the same for all of computing resources 230.

In some implementations, virtual network device 240 of the particular computing resource 230 may receive or retrieve the local addresses associated with the local VLANs. For example, when a local VLAN is established in the particular computing resource 230, MAC addresses of one or more VMs 234 may be assigned to be members of the local VLAN and provided to virtual network device 240 of the particular computing resource 230.

As further shown in FIG. 4, process 400 may include storing the local addresses in a data structure (block 420). For example, the particular computing resource 230 may include a data structure, such as, for example, a database, a table, a list, an array, etc. In some implementations, the data structure may include information associated with addresses to be utilized by virtual network device 240 to send and/or receive traffic. In some implementations, virtual network device 240 may store the local addresses, and information associated with the local addresses, in the data structure.

As shown in FIG. 4, process 400 may include receiving or retrieving remote addresses associated with remote computing resources of the cloud computing environment (block 430). For example, cloud computing environment 220 may include remote computing resources 230 that are separate from the particular computing resource 230. In some implementations, each computing resource 230 of cloud computing environment 220 may be considered a remote computing resource 230 to the remaining computing resources 230 of cloud computing environment 220. One or more remote computing resources 230 may be associated with a VLAN (e.g., referred to herein as a remote VLAN) that is remote to the particular computing resource 230. In some implementations, each remote VLAN may include one or more applications 232, virtual machines 234, virtualized storage 236, hypervisors 238, etc.

In some implementations, each remote VLAN may be associated with a corresponding address (e.g., referred to herein as a remote address) that enables the particular computing resource 230 to provide traffic (e.g., packets) to and/or receive traffic from the remote VLAN. Each remote address may include a MAC address, etc. In some implementations, virtual network device 240 of the particular computing resource 230 may receive or retrieve the remote addresses associated with the remote VLANs. For example, when a remote VLAN is established in cloud computing environment 220, a remote address may be assigned to the remote VLAN and provided to virtual network device 240 of the particular computing resource 230.

As further shown in FIG. 4, process 400 may include storing the remote addresses in the data structure (block 440). For example, virtual network device 240 of the particular computing resource 230 may store the remote addresses, and information associated with the remote addresses, in the data structure. In some implementations, the data structure may store addresses (e.g., the local addresses, the remote addresses, etc.); identifiers associated with the addresses (e.g., local VLAN identifiers, remote VLAN identifiers, etc.); etc.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. Further, one or more blocks may be omitted in some implementations.

Figure 5A:
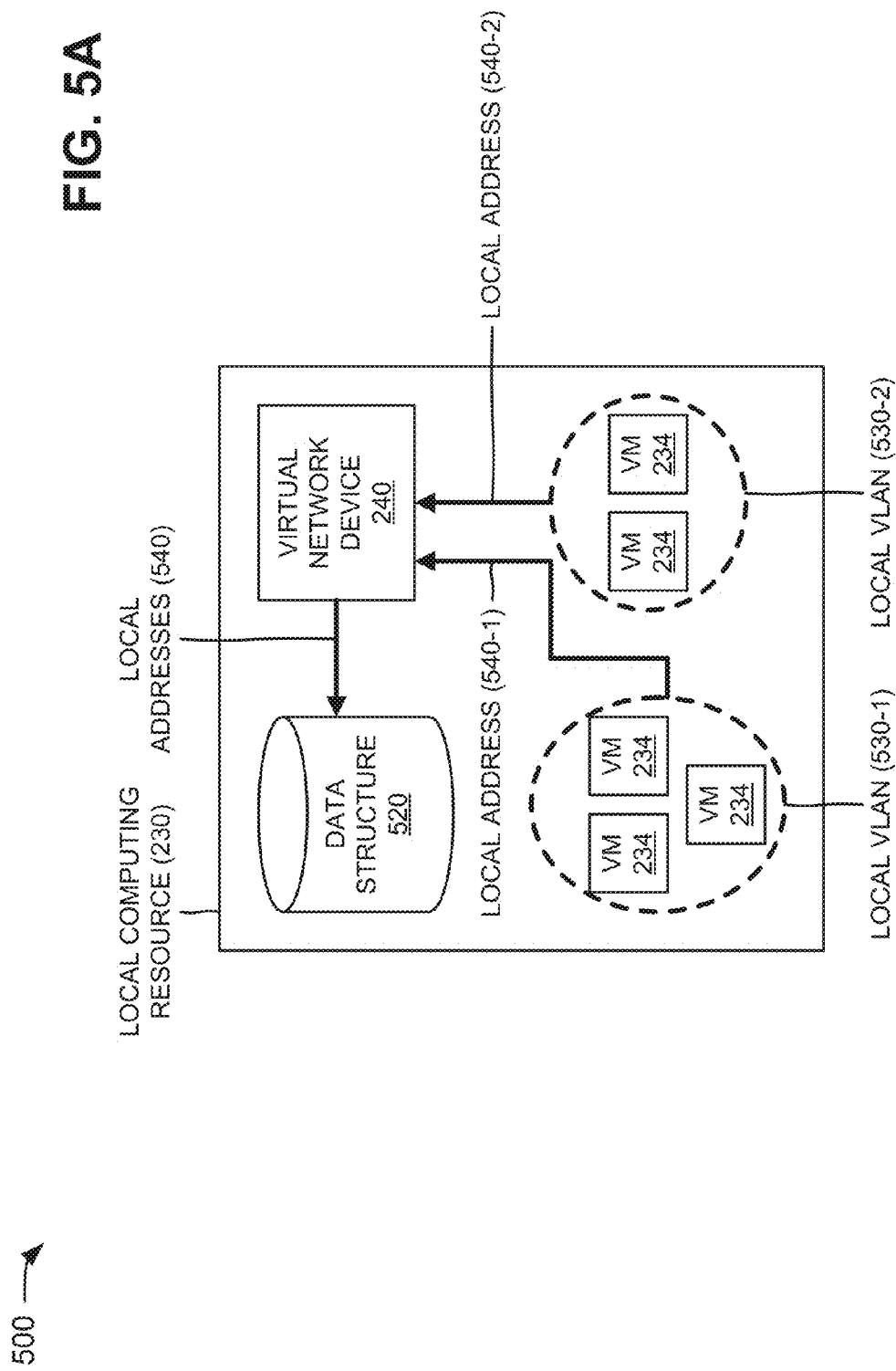

FIGS. 5A-5D are diagrams of an example 500 of the process described above with respect to FIG. 4. In example 500, assume that a local computing resource 230 includes virtual network device 240 and a data structure 520, as shown in FIG. 5A. Data structure 520 may include a database, a table, a list, an array, etc. As further shown in FIG. 5A, local computing resource 230 may include a first local VLAN 530-1 associated with three virtual machines 234 and a second local VLAN 530-2 associated with two virtual machines 234. The first local VLAN 530-1 may be associated with one or more processing units 320 (not shown in FIG. 5A) that provide the three virtual machines 234. The second local VLAN 530-2 may be associated with one or more processing units 320 (not shown in FIG. 5A) that provide the two virtual machines 234.

As further shown in FIG. 5A, the first local VLAN 530-1 may include a first local address 540-1 (e.g., 00:11:22:33:44), and the second local VLAN 530-2 may include a second local address 540-2 (e.g., 55:66:77:88:99). Virtual network device 240 may receive the first local address 540-1 from the first local VLAN 530-1, and may receive the second local address 540-2 from the second local VLAN 530-2. Virtual network device 240 may store the first local address 540-1 and the second local address 540-2 in data structure 520, as indicated by reference number 540.

Figure 5B:
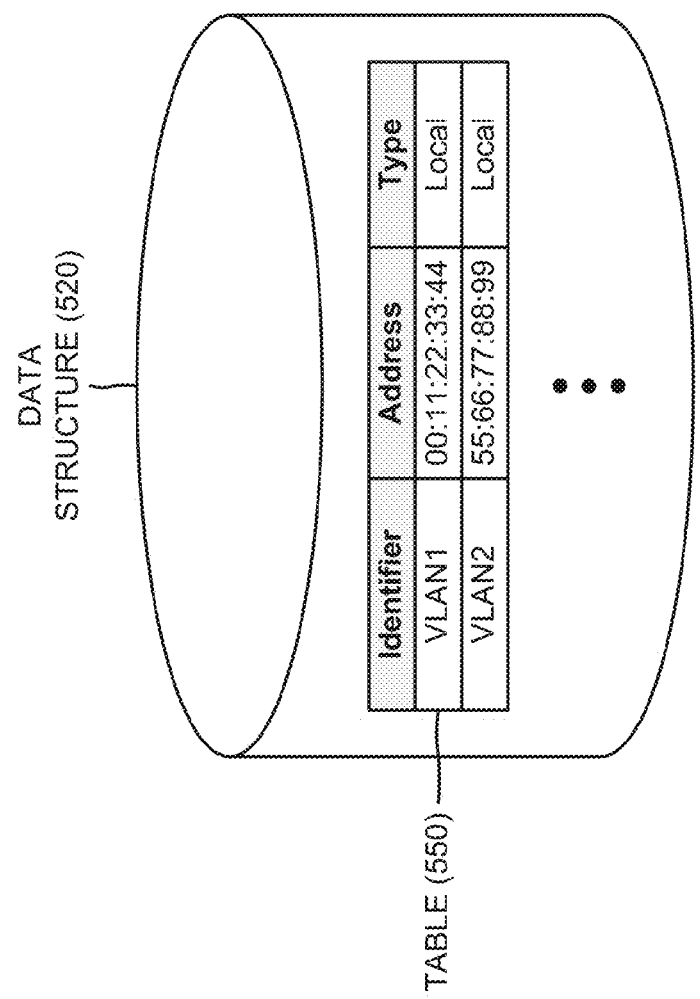

In example 500, further assume that data structure 520 includes a table 550, as shown in FIG. 5B. Data structure 520 may store information associated with local addresses 540 in table 550. Table 550 may include an identifier field, an address field, a type field, and a variety of entries associated with the fields. For example, the first local address 540-1 may include an address (e.g., 00:11:22:33:44), and may be associated with an identifier (e.g., VLAN1) of the first local VLAN 530-1. The second local address 540-2 may include an address (e.g., 55:66:77:88:99), and may be associated with an identifier (e.g., VLAN2) of the second local VLAN 530-2. Data structure 520 may store the identifiers (e.g., VLAN1 and VLAN2) in the identifier field, and local addresses 540 (e.g., 00:11:22:33:44 and 55:66:77:88:99) in the address field. Data structure 520 may store address type information (e.g., local) in the type field. Data structure 560 may store similar information for other local addresses 540 associated with local computing resource 230.

In example 500, further assume that local computing resource 230 is associated with a first remote VLAN 560-1 and a second remote VLAN 560-2, as shown in FIG. 5C. The first remote VLAN 560-1 may be associated with a first remote computing resource 230 separate from local computing resource 230. The first remote computing resource 230 may provide one or more applications 232, virtual machines 234, virtualized storage 236, hypervisors 238, etc. (e.g., VMs 234 are shown in FIG. 5C as an example). The second remote VLAN 560-2 may be associated with a second remote computing resource 230 separate from local computing resource 230. The second remote computing resource 230 may provide one or more applications 232, virtual machines 234, virtualized storage 236, hypervisors 238, etc. (e.g., VMs 234 are shown in FIG. 5C as an example).

As further shown in FIG. 5C, the first remote VLAN 560-1 may include a first remote address 570-1 (e.g., 11:33:55:77:99), and the second remote VLAN 560-2 may include a second remote address 570-2 (e.g., 22:44:66:88:00). Virtual network device 240 may receive the first remote address 570-1 from the first remote VLAN 560-1, and may receive the second remote address 570-2 from the second remote VLAN 560-2. Virtual network device 240 may store the first remote address 560-1 and the second remote address 560-2 in data structure 520, as indicated by reference number 570.

Figure 5D:
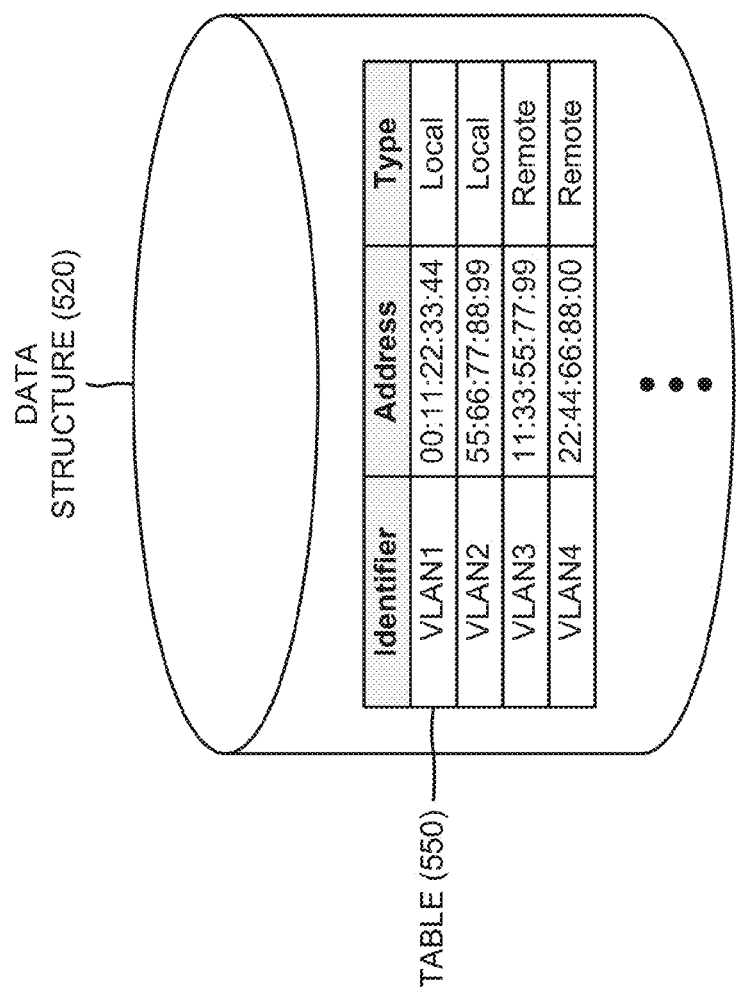

As shown in FIG. 5D, data structure 520 may store information associated with remote addresses 570 in table 550. In example 500, assume that the first remote address 570-1 includes an address (e.g., 11:33:55:77:99), and is associated with an identifier (e.g., VLAN3) of the first remote VLAN 560-1. Further assume that the second remote address 570-2 includes an address (e.g., 22:44:66:88:00), and is associated with an identifier (e.g., VLAN4) of the second remote VLAN 560-2. Data structure 520 may store the identifiers (e.g., VLAN3 and VLAN4) in the identifier field, and remote addresses 570 (e.g., 11:33:55:77:99 and 22:44:66:88:00) in the address field. Data structure 520 may store address type information (e.g., remote) in the type field. Data structure 560 may store similar information for other remote addresses 570 associated with local computing resource 230. In some implementations, virtual network device 240 may utilize the information provided in data structure 520 to transfer traffic with remote computing resources 230 and/or with hardware components of local computing resource 230.

In some implementations, virtual network device 240 may perform a table lookup of data structure 520 using local a VLAN ID and a MAC address. The table lookup result may include a type (e.g., local or remote), and a destination address (DA). For local addresses, the DA may include a local switch fabric address used to reach the destination. For remote addresses, the DA may include a MAC address of a remote virtual network device that can reach the destination, and a VLAN ID of a remote destination reachable from the remote virtual network device (e.g., which may be different than the VLAN ID used in the lookup by virtual network device 240). In some implementations, this may enable a same logical Layer 2 (L2) network to use different VLAN IDs on different computing resources. In some implementations, the information provided in data structure 520 may be learned as local computing resource 230 is used and/or may be configured by virtual network device 240.

In some implementations, data structure 520 may include a VLAN membership table that includes a list of local and remote destination addresses (DAs). Virtual network device 240 may perform a table lookup of the VLAN membership table using a local VLAN ID. The lookup result may include a list of zero or more local DAs and zero or more remote DAs. The local DAs may include all local destination VMs 234 that need to receive a broadcast. The remote DAs may include all remote virtual network devices 240 that can reach one or more destination VMs 234. The destination VMs 234 may be discovered with a lookup in the VLAN membership table based on the VLAN ID from the remote DA and based on the list of local DAs.

As indicated above, FIGS. 5A-5D are provided merely as an example. Other examples are possible and may differ from what was described with regard to FIGS. 5A-5D.

Figure 6:
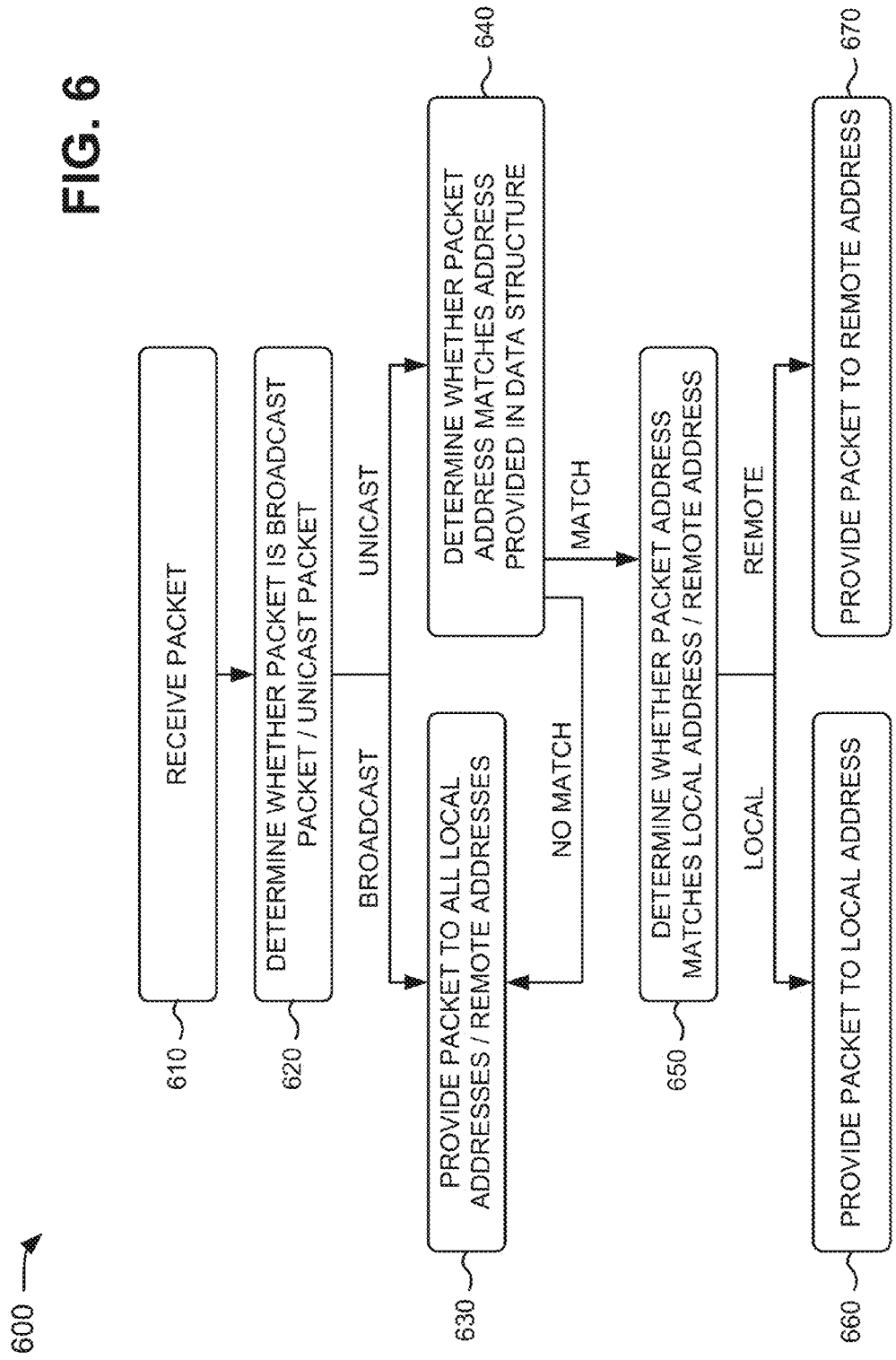
FIG. 6 is a flow chart of an example process for processing a broadcast packet or a unicast packet with a computing resource of a cloud computing environment.

FIG. 6 is a flow chart of an example process 600 for processing a broadcast packet or a unicast packet with a computing resource of a cloud computing environment. In some implementations, process 600 may be performed by computing resource 230. In some implementations, process 600 may be performed by another device or a group of devices separate from or including computing resource 230.

As shown in FIG. 6, process 600 may include receiving a packet (block 610). For example, user device 210 may provide a packet to a particular computing resource (e.g., local computing resource 230) based on interactions of user device 210 with local computing resource 230. For example, if user device 210 is utilizing a software application associated with local computing resource 230, the software application may request information from user device 210 and user device 210 may provide the packet in response to the request. In some implementations, a remote computing resource 230 may provide the packet to local computing resource 230. For example, if the remote computing resource 230 is also associated with the software application, local computing resource 230 may request information for the software application from remote computing resource 230. Remote computing resource 230 may provide the packet in response to the request.

Virtual network device 240 of local computing resource 230 may receive the packet from user device 210 or remote computing resource 230. In some implementations, the packet may include a unicast packet addressed to a local VLAN of local computing resource 230 or to a remote VLAN. In some implementations, the packet may include a broadcast packet addressed to one or more local VLANs of local computing resource 230 or to one or more remote VLANs.

As further shown in FIG. 6, process 600 may include determining whether the packet is a broadcast packet or a unicast packet (block 620). For example, virtual network device 240 may analyze a destination address of the packet to determine whether the packet is a broadcast packet or a unicast packet. In some implementations, a media access control (MAC) destination address of the packet may be used to determine whether the packet is a broadcast packet or a unicast packet. If the MAC destination address includes a particular sequence of bits (e.g., all "1s"), the packet may be identified as a broadcast packet to be sent to all local hardware components or to remote computing resources 230 in a broadcast domain. If the MAC destination address includes a single address, the packet may be identified as a unicast packet to be sent to the single address.

As shown in FIG. 6, if the packet is a broadcast packet (block 620—BROADCAST), process 600 may include providing the packet to all local addresses and remote addresses (block 630). For example, virtual network device 240 may determine that the packet is a broadcast packet when the MAC destination address of the packet includes a particular sequence of bits (e.g., all "1s"). Based on this determination, virtual network device 240 may retrieve all local addresses 540 and all remote addresses 570 stored in data structure 520. Virtual network device 240 may forward the packet to the retrieved local addresses 540 or to remote addresses 570. For example, if the packet includes an update associated with content stored at local addresses 540 or remote addresses 570, virtual network device 240 may broadcast the update to local addresses 540 or to remote addresses 570 at one time. This way all resources (e.g., VMs 234, virtualized storage 236, etc.) provided at local addresses 540 or at remote addresses 570 may update the content at one time.

As further shown in FIG. 6, if the packet is a unicast packet (block 620—UNICAST), process 600 may include determining whether the packet address matches an address provided in a data structure (block 640). For example, virtual network device 240 may determine that the packet is a unicast packet when, for example, the MAC destination address of the packet includes a single address. Based on this determination, virtual network device 240 may determine whether the packet address matches a local address 540 or a remote address 570 stored in data structure 520. For example, virtual network device 240 may compare the MAC destination address of the packet with the addresses provided in the address field of table 550 to determine whether the MAC destination address matches an address of table 550.

As shown in FIG. 6, if the packet address does not match an address provided in the data structure (block 640—NO MATCH), process 600 may include providing the packet to all local addresses and remote addresses (block 630). For example, virtual network device 240 may determine that the packet address does not match addresses stored in data structure 520 when, for example, the MAC destination address of the packet does not match any of the addresses of table 550. Based on this determination, virtual network device 240 may retrieve all local addresses 540 and all remote addresses 570 stored in data structure 520, and may forward the packet to the retrieved local addresses 540 and remote addresses 570.

As further shown in FIG. 6, if the packet address matches an address provided in the data structure (block 640—MATCH), process 600 may include determining whether the packet address matches a local address or a remote address (block 650). For example, virtual network device 240 may determine that the packet address matches an address stored in data structure 520 when, for example, the MAC destination address of the packet matches an address of table 550. Based on this determination, virtual network device 240 may determine whether the matching address is one of local addresses 540 or one of remote addresses 570. For example, virtual network device 240 may determine whether the matching address is a local address or a remote address based on the information provided in the type field of table 550.

As shown in FIG. 6, if the packet address matches a local address (block 650—LOCAL), process 600 may include providing the packet to the local address (block 660). For example, virtual network device 240 may determine that the packet address matches a local address stored in data structure 520 when the type field of table 550 indicates that the matching address is a local address. Based on this determination, virtual network device 240 may provide the packet to the local address. For example, assume that the packet includes information associated with a software application being executed by a particular VM 234 of local VLAN 530-1. Virtual network device 240 may forward the information to local address 540-1 associated with local VLAN 530-1, and local VLAN 530-1 may provide the information to the particular VM 234.

As further shown in FIG. 6, if the packet address matches a remote address (block 650—REMOTE), process 600 may include providing the packet to the remote address (block 670). For example, virtual network device 240 may determine that the packet address matches a remote address stored in data structure 520 when the type field of table 550 indicates that the matching address is a remote address. Based on this determination, virtual network device 240 may provide the packet to the remote address. For example, assume that the packet includes content to be stored in virtualized storage 236 of remote VLAN 560-1. Virtual network device 240 may forward the content to remote address 570-1 associated with remote VLAN 560-1, and remote VLAN 560-1 may provide the content to virtualized storage 236.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Further, one or more blocks may be omitted in some implementations.

Figure 7A:
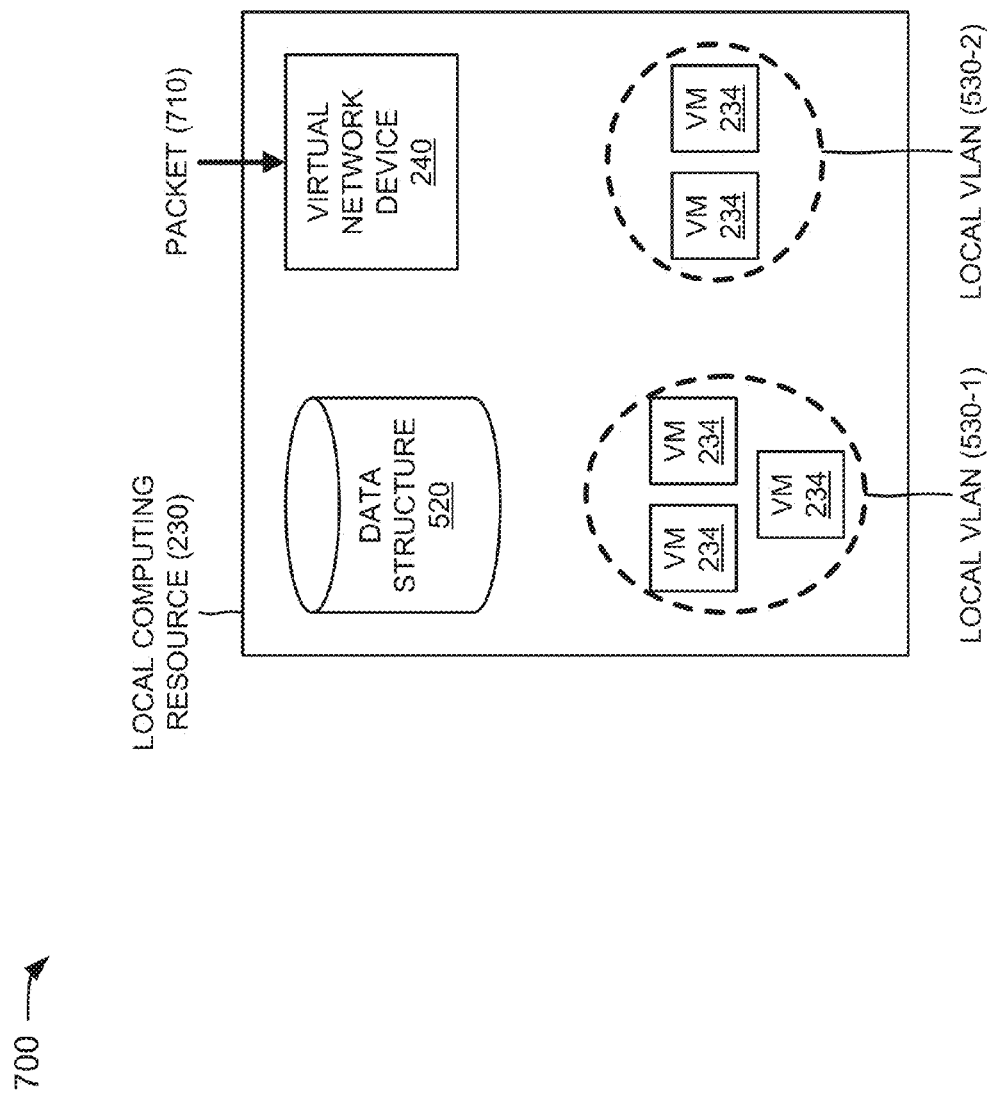

FIGS. 7A-7E are diagrams of an example 700 of the process described above with respect to FIG. 6. In example 700, assume that local computing resource 230 receives a packet 710, as shown in FIG. 7A. Further assume that packet 710 is to be broadcast to a local VLAN or to a remote VLAN associated with local computing resource 230. For example, assume that packet 710 includes an update to a database application provided by the local VLANs and the remote VLANs associated with local computing resource 230. Virtual network device 240 may receive packet 710, and may determine that packet 710 is a broadcast packet since a MAC destination address of packet 710 includes a particular sequence of bits (e.g., all "1s") that identify packet 710 as a broadcast packet.

Figure 7B:
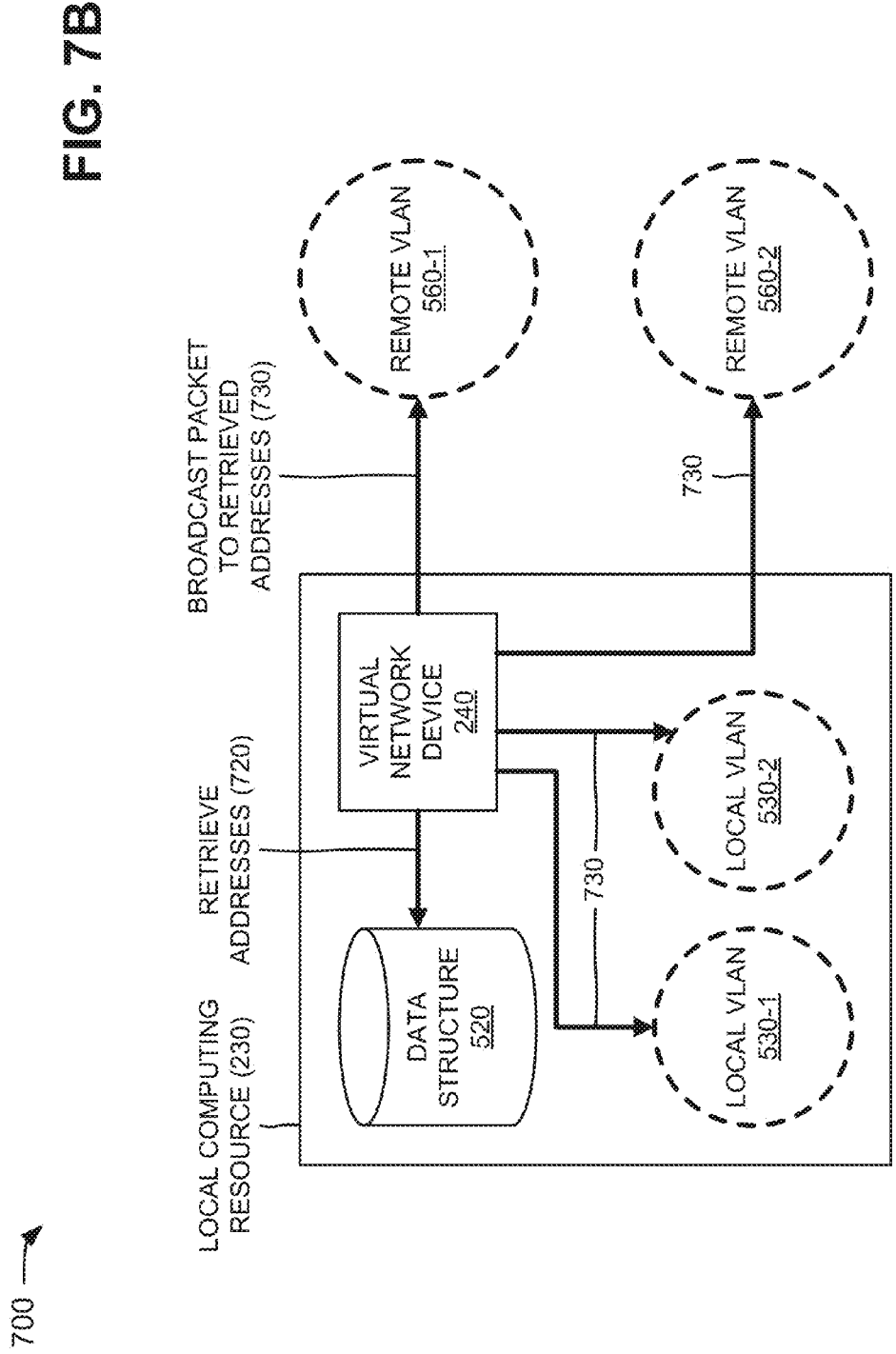

Based on this determination, virtual network device 240 may retrieve all local addresses 540 or all remote addresses 570 (e.g., associated with local computing resource 230) stored in data structure 520, as indicated by reference number 720 in FIG. 7B. Virtual network device 240 may broadcast packet 710 to local addresses 540 or to remote addresses 570 retrieved from data structure 520. For example, virtual network device 240 may broadcast packet 710 to the first local VLAN 530-1 and the second local VLAN 530-2, or may broadcast packet 710 to the first remote VLAN 560-1 and the second remote VLAN 560-2, as indicated by reference number 730. Local VLANs 530 or remote VLANs 560 may receive packet 710, and may update the database application based on the update provided in packet 710. For example, the update may include an anti-virus update which may protect the database application against the latest viruses.

Figure 7C:
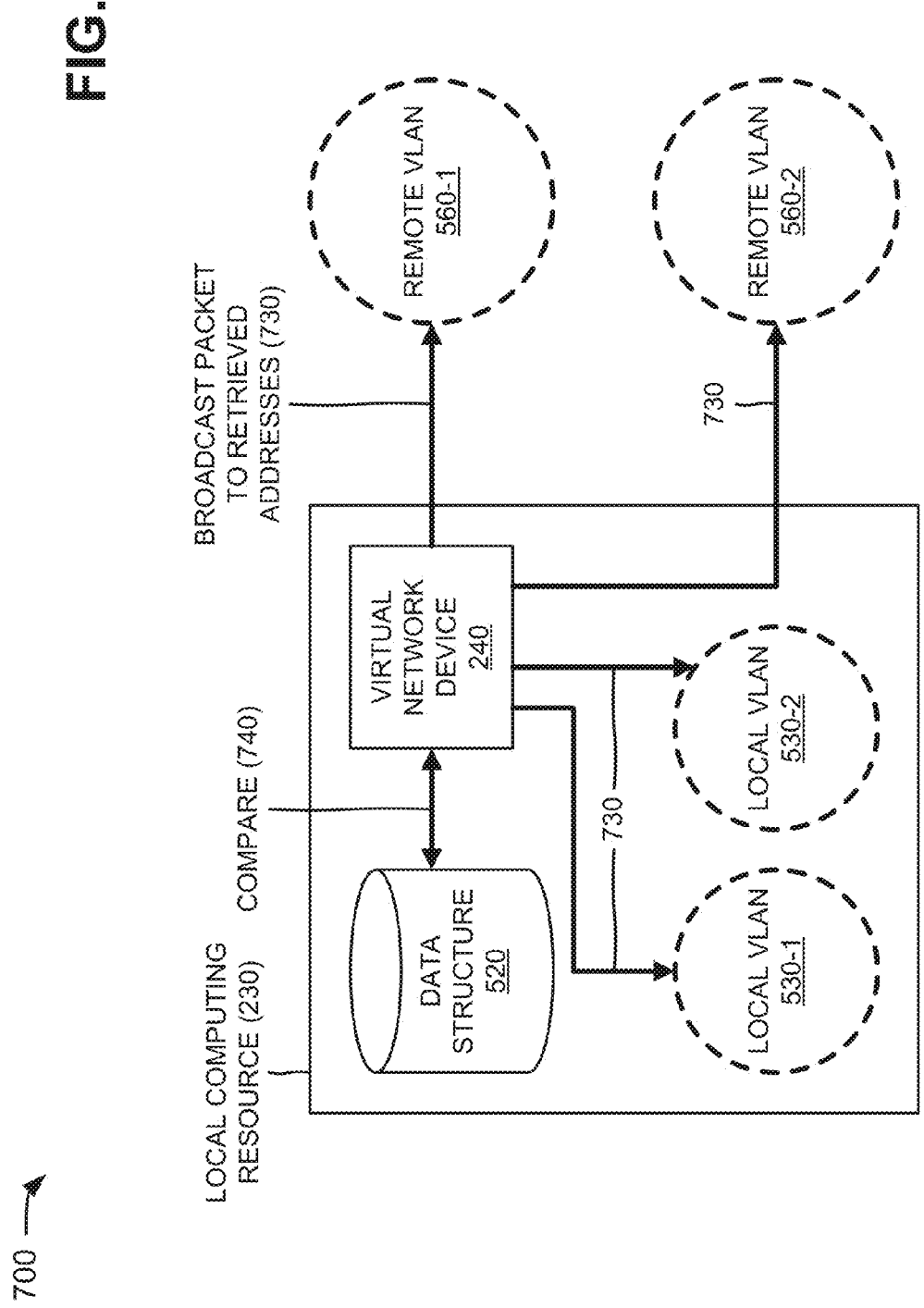

Now, turning to FIG. 7C, assume that packet 710 is a unicast packet to be provided to a single local address 540 or a single remote address 570 associated with local computing resource 230, rather than a broadcast packet. Further assume that packet 710 includes information requested by a word processing application provided by a local VLAN or a remote VLAN associated with local computing resource 230. Virtual network device 240 may receive packet 710, and may determine that packet 710 is a unicast packet since a MAC destination address of packet 710 includes a single address.

Based on this determination, virtual network device 240 may determine whether an address of packet 710 matches a local address 540 or a remote address 570 stored in data structure 520. For example, virtual network device 240 may compare the MAC destination address of packet 710 with the addresses provided in data structure 520, as indicated by reference number 740 in FIG. 7C. If the address of packet 710 does not match an address stored in data structure 520, virtual network device 240 may broadcast packet 710 to local addresses 540 or to remote addresses 570 associated with local computing resource 230. For example, virtual network device 240 may broadcast packet 710 to the first local VLAN 530-1 and the second local VLAN 530-2, or may broadcast packet 710 to the first remote VLAN 560-1 and the second remote VLAN 560-2, as indicated by reference number 730 in FIG. 7C.

Local VLANs 530 or remote VLANs 560 may receive packet 710 (e.g., the information requested by the word processing application). If particular local VLANs 530/remote VLANs 560 do not provide the word processing application, the particular local VLANs 530/remote VLANs 560 may discard the information provided by packet 710. If particular local VLANs 530/remote VLANs 560 provide the word processing application, the particular local VLANs 530/remote VLANs 560 may utilize the information provided by packet 710. Such an arrangement may ensure that a unicast packet is delivered to an appropriate VLAN even when local computing resource 230 does not have knowledge of the appropriate VLAN for the unicast packet.

Figure 7D:
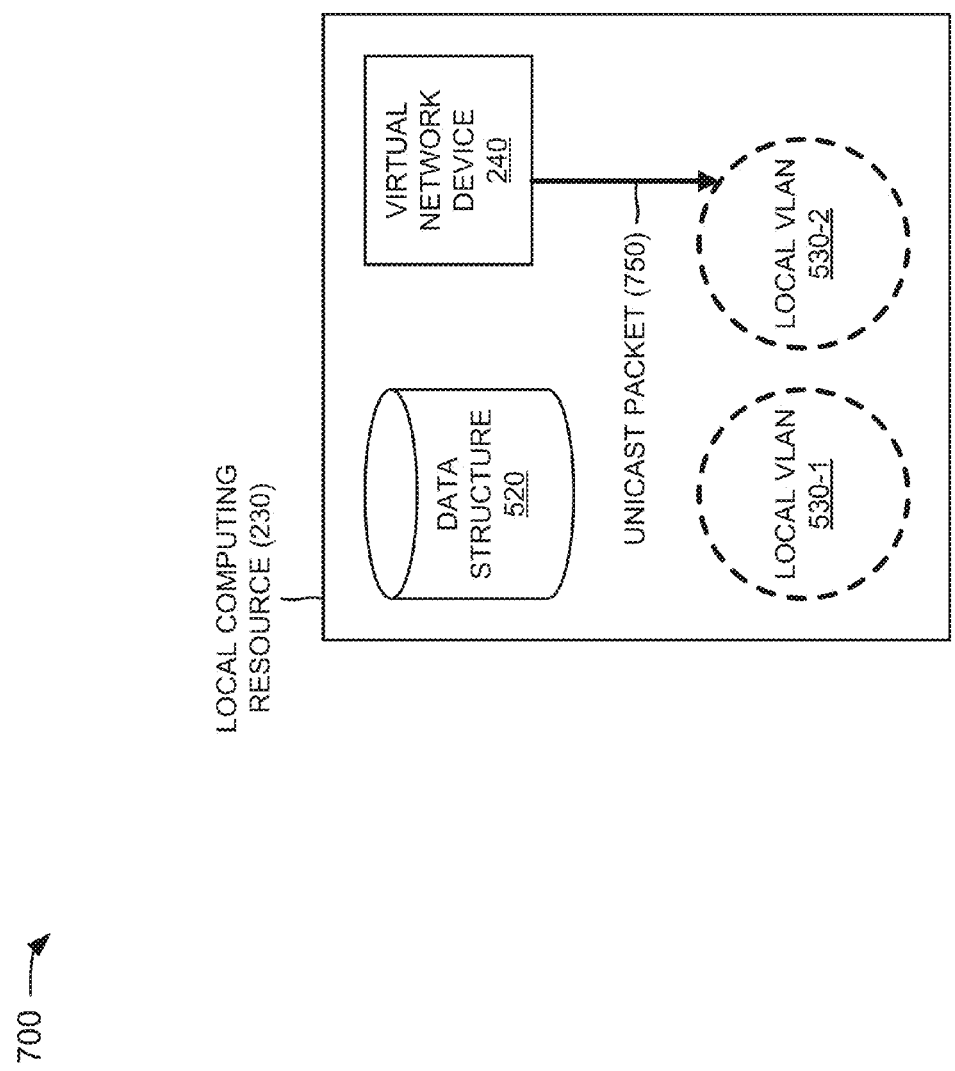

If the address of packet 710 matches an address stored in data structure 520, virtual network device 240 may provide packet 710 to the matching address. For example, if the matching address includes a local address, virtual network device 240 may provide packet 710 to the local address. As shown in FIG. 7D, if the matching address includes the second local address 540-2 associated with the second local VLAN 530-2, virtual network device 240 may provide packet 710 to the second local VLAN 530-2, as indicated by reference number 750. The second local VLAN 530-2 may receive packet 710, and may provide the information of packet 710 to the word processing application.

In some implementations, if the matching address includes a remote address, virtual network device 240 may provide packet 710 to the remote address. As shown in FIG. 7E, if the matching address includes the first remote address 570-1 associated with the first remote VLAN 560-1, virtual network device 240 may provide packet 710 to the first remote VLAN 560-1, as indicated by reference number 760. The first remote VLAN 560-1 may receive packet 710, and may provide the information of packet 710 to the word processing application.

As indicated above, FIGS. 7A-7E are provided merely as an example. Other examples are possible and may differ from what was described with regard to FIGS. 7A-7E.

Systems and/or methods described herein may provide a virtual network device in computing resources provided in a cloud computing environment and may enable the virtual network devices to scale to a large number of VMs or other cloud resources. The virtual network devices may utilize a Layer 2 protocol to transfer data between computing resources (e.g., remote VLANs) in the cloud computing environment or between local hardware (e.g., local VLANs) within the same computing resource. Each virtual network device may know the addresses in the local VLANs and the remote VLANs.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

As used herein, the term "user" is intended to be broadly interpreted to include a user device, or a user of a user device.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a virtual network device, a packet,
        the virtual network device being provided in a computing resource of a cloud computing environment, and
        the packet including an address;
    selectively,
        determining, by the virtual network device, whether the packet is a broadcast packet or a unicast packet,
            the packet being the broadcast packet when the packet includes a particular sequence of bits, and
            the packet being the unicast packet when the packet includes a single address; and
        providing, by the virtual network device and when the packet is the broadcast packet, the packet to one or more of local addresses or remote addresses,
            providing the packet including, when the packet is the broadcast packet and if the packet includes an update, broadcasting the update to one or more of the local addresses or the remote addresses; or
        determining, by the virtual network device and when the packet is the unicast packet, that the address matches first information in an address field of a data structure;
        determining, by the virtual network device and when the packet is the unicast packet, whether the address matches a local address, of the local addresses and of a local virtual local area network (VLAN) provided in the computing resource of the cloud computing environment, or a remote address, of the remote addresses and of a remote VLAN provided in the cloud computing environment, based on determining that the address matches the first information in the address field and based on second information, in a type field of the data structure, that corresponds to the first information; and
        processing, by the virtual network device and when the packet is the unicast packet, the packet based on whether the address of the packet matches the local address or the remote address.

2. The method of claim 1, further comprising:
    providing the packet to the local address and the remote address when the packet is the unicast packet and the address does not match the local address or the remote address.

3. The method of claim 1, where processing the packet based on whether the address of the packet matches the local address or the remote address comprises:
    providing the packet to the local address when the address matches the local address; or
    providing the packet to the remote address when the address matches the remote address.

4. The method of claim 1,
    where the local address and the remote address are provided in the data structure, and
    where the data structure is associated with the virtual network device.

5. The method of claim 4, further comprising:
    receiving the remote address after the remote address is assigned to the remote VLAN; and
    storing the local address and the remote address in the data structure.

6. A device of a cloud computing environment, the device comprising:
    a memory to store:
        a plurality of local addresses, and
        a plurality of remote addresses; and
    one or more processors to:
        implement a virtual network device to:
            receive a packet that includes an address,
            selectively,
                determine whether the packet is a broadcast packet or a unicast packet,
                    the packet being the broadcast packet when the packet includes a particular sequence of bits, and
                    the packet being the unicast packet when the packet includes a single address; and
                provide, when the packet is the broadcast packet, the packet to one or more of local addresses or remote addresses,
                    when the packet is the broadcast packet and if the packet includes an update, the virtual network device is implemented, when providing the packet to, broadcasting the update to one or more of the plurality of local addresses or the plurality of remote addresses; or determine, when the packet is the unicast packet, that the address matches first information in an address field of a data structure, determine, when the packet is the unicast packet, based on determining that the address matches the first information in the address field and based on second information, in a type field of the data structure that corresponds to the first information, whether the address matches one of the plurality of local addresses or one of the plurality of remote addresses, the one of the plurality of local addresses being associated with a local virtual local area network (VLAN) provided in a computing resource of the cloud computing environment, and the one of the plurality of remote addresses being associated with a remote VLAN provided in the cloud computing environment, and process, when the packet is the unicast packet, the packet based on whether the address of the packet matches the one of the plurality of local address or the one of the plurality of remote addresses.

7. The device of claim 6, where the virtual network device is further to:

provide the packet to the one of the plurality of local addresses and the one of the plurality of remote addresses when the packet is the unicast packet and the address does not match the one of the plurality of local addresses or the one of the plurality of remote addresses.

8. The device of claim 6, where, when processing the packet, the virtual network device is to:

provide the packet to the one of the plurality of local addresses when the address matches the one of the plurality of local addresses, and provide the packet to the one of the plurality of remote addresses when the address matches the one of the plurality of remote addresses.

9. The device of claim 6, where the plurality of local addresses and the plurality of remote addresses are provided in the data structure, and where the data structure is stored in the memory.

10. The device of claim 9, where the virtual network device is further to:

receive the plurality of remote addresses from one or more other devices of the cloud computing environment, and store the plurality of local addresses and the plurality of remote addresses in the data structure.

11. A non-transitory computer-readable medium storing instructions, the instructions comprising:

one or more instructions that, when executed by one or more processors of one or more devices of a cloud computing environment, cause the one or more processors to:

implement a virtual network device to:

receive a packet that includes an address, selectively, determine whether the packet is a broadcast packet or a unicast packet, the packet being the broadcast packet when the packet includes a particular sequence of bits, and the packet being the unicast packet when the packet includes a single address; and provide, when the packet is the broadcast packet, the packet to one or more of local addresses or remote addresses, when the packet is the broadcast packet and if the packet includes an update, the one or more instructions to provide the packet include one or more instructions to broadcast the update to one or more of the local addresses or the remote addresses; or determine, when the packet is the unicast packet, that the address matches first information in an address field of a data structure based on determining that the packet is the unicast packet, determine, when the packet is the unicast packet, based on determining that the address matches the first information in the address field and based on second information, in a type field of the data structure, whether the address, matches at least one local address, of the local addresses, or at least one remote address of the remote addresses, the at least one local address being associated with a local virtual local area network (VLAN) provided in the one or more devices, and the at least one remote address being associated with a remote virtual local area network (VLAN) provided outside of the one or more devices, and process, when the packet is the unicast packet, the packet based on whether the address, of the packet, matches the at least one local address, of the local addresses, or the at least one remote address of the remote addresses.

12. The non-transitory computer-readable medium of claim 11, further comprising:

one or more instructions that, when executed by the one or more processors, cause the one or more processors to:

implement the virtual network device to:

provide the packet to the at least one local address and the at least one remote address when the packet is the unicast packet and the address does not match the at least one local address, of the local addresses, or the at least one remote address of the remote addresses.

13. The non-transitory computer-readable medium of claim 11, further comprising:

one or more instructions that, when executed by the one or more processors, cause the one or more processors to:

implement the virtual network device to:

provide, when processing the packet, the packet to a particular local address, of the at least one local address, when the address matches the particular local address, and provide, when processing the packet, the packet to a particular remote address, of the at least one remote address, when the address matches the particular remote address.

14. The non-transitory computer-readable medium of claim 11, where the local addresses and the remote addresses are provided in the data structure.

15. The non-transitory computer-readable medium of claim 11, further comprising:

one or more instructions that, when executed by the one or more processors, cause the one or more processors to:

implement the virtual network device to:
provide, when processing the packet, the packet to a first virtual machine (VM) in the local VLAN or to a second VM in the remote VLAN.

16. The method of claim 1, where processing the packet based on whether the address of the packet matches the local address or the remote address comprises:
   determining that the address of the packet matches the local address, and
   providing the packet to a virtual machine (VM) in the local VLAN based on determining that the address of the packet matches the local address.

17. The device of claim 6, where the packet includes information associated with a software application being executed by a virtual machine of the local VLAN.

18. The device of claim 17, where the one or more processors are further to:
   implement the virtual network device to:
   provide, when processing the packet, the packet to the local VLAN,
   the VLAN providing the information associated with the software application to the virtual machine.

19. The method of claim 1, where the data structure further comprises an identifier field that includes an identifier, of the local VLAN or the remote VLAN, that corresponds to the first information and the second information.

20. The non-transitory computer-readable medium of claim 11, further comprising:
   one or more instructions that, when executed by the one or more processors, cause the one or more processors to:
   implement the virtual network device to:
   receive another packet;
   determine that the other packet is the broadcast packet; and
   provide the other packet to the local addresses and the remote addresses based on the other packet being the broadcast packet.

\* \* \* \* \*